No. 883,833. PATENTED APR. 7, 1908.
L. ROSSI.
DETACHABLE FASTENING DEVICE.
APPLICATION FILED NOV. 13, 1907.
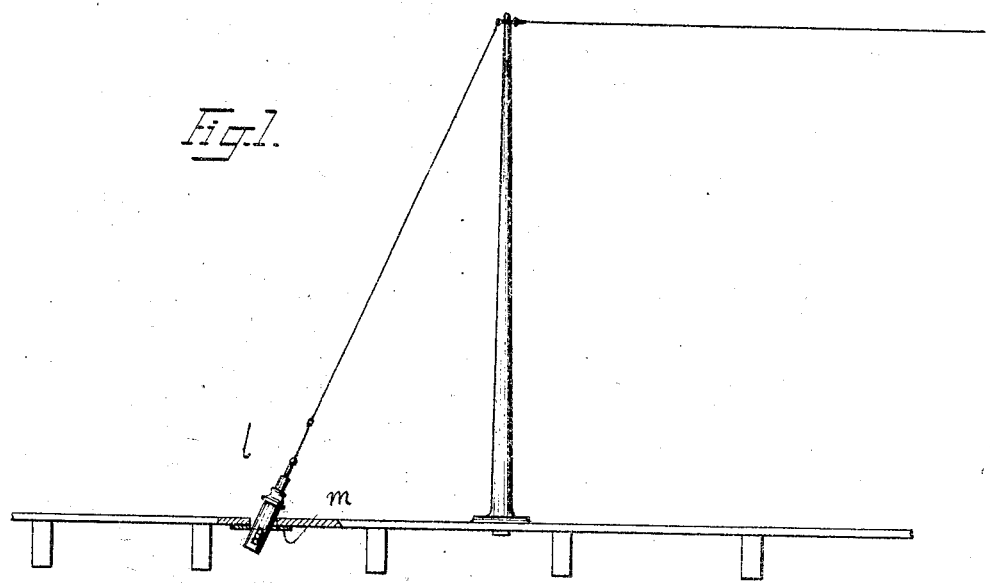
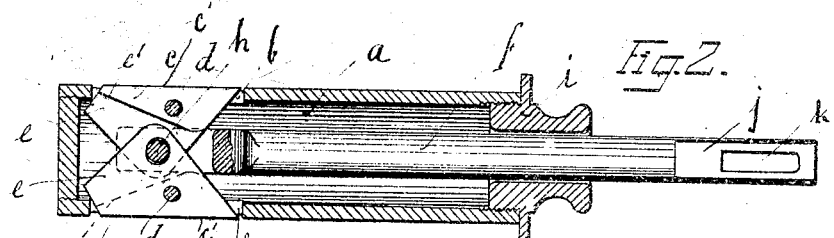
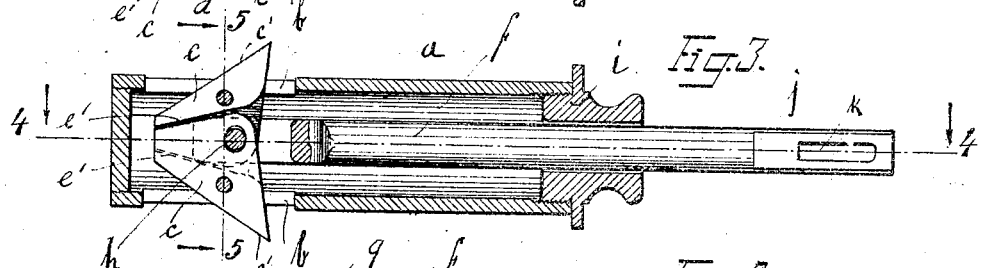
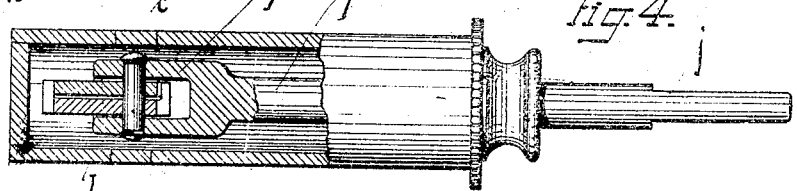
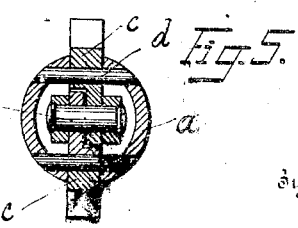

UNITED STATES PATENT OFFICE.

LUIGI ROSSI, OF NEW YORK, N. Y.

DETACHABLE FASTENING DEVICE.

No. 883,833.   Specification of Letters Patent.   Patented April 7, 1908.

Application filed November 13, 1907. Serial No. 401,952.

*To all whom it may concern:*

Be it known that I, LUIGI ROSSI, a subject of the King of Italy, and a resident of New York, county of New York, State of New York, have invented certain new and useful Improvements in Detachable Fastening Devices, of which the following is a specification.

The present invention relates to detachable fastening devices, and has for its object to provide a construction that will allow an easy and rapid manipulation of the device.

The device is particularly designed for temporary and safe fastening of various stage appliances, as acrobatic appliances. But the same can also be used for different other purposes, as for the suspension of articles from the ceiling, etc.

To make my invention more clear, the same is illustrated in the accompanying drawing in which similar reference letters denote corresponding parts and in which Figure 1 illustrates the device in use with a stage appliance; Figs. 2 and 3 are longitudinal sections of the fastening device, the fastening members being illustrated in retracted and projected positions, respectively; Fig. 4 is a partial longitudinal section made at a right angle to those in Figs. 2 and 3, and Fig. 5 is a cross section on line 5—5 of Fig. 3.

With reference to the drawing, $a$ denotes a tubular casing which, at one end, may be closed. Adjacent to this end, the casing is provided with diametrically opposed longitudinal slots $b$, $b$, opposite which trapezoid shaped members $c$, $c$ are arranged to be capable of swinging to and fro through said slots around pins $d$, $d$ borne in the casing. The inner portions $e$, $e$ of said members are cut out forming shoulders $e'$, $e'$, or stops and are adapted to overlap one another (Fig. 5).

Extending longitudinally and centrally through the casing is a rod $f$ the inner end $g$ of which is bifurcated to engage the overlapping inner portions $e$, $e$ of the swinging members $c$, $c$, and to be fastened thereto by a pin $h$. This rod is loosely guided in the head $i$ screwed into the open end of the casing $a$ and permitting the rod to move longitudinally in said casing. The outer end $j$ of the rod may be formed with an eyelet $k$, hook or the like, for its connection with the article to be fastened. When the rod is slightly pulled outward, its lower end will cause the members $c$, $c$ to swing around their pivots $d$, $d$ so that the portion of said members at one side of the pivots will be retracted into and the other portion will be projected outward from the casing through its slots, their shoulders $e'$, $e'$ being hereby brought to abut against one another preventing the members from turning around any farther. These projected portions of the members will form catches to temporarily fasten the article at the desired place. Normally the outer edges $c'$, $c'$ of the members $c$ $c$ will lie level with the outer surface of the casing.

To apply this fastening device, a hole $l$ of about the same diameter as the casing is made in the desired place, into which the rear end of the device is introduced. As soon as the rod is slightly pulled outward either by means of a screw nut, as in the case of fastening a cable (tight rope appliance as in Fig. 1) or by the weight of the article to be suspended, the members $c$, $c$ are swung outward and are caused to engage behind the opening either by grasping the walls around the latter or a washer $m$.

What I claim and desire to secure by Letters Patent is:—

In a temporary fastening device, a tubular casing, having diametrically opposed longitudinal perforations, a pair of members pivoted in said casing to swing through said perforations, and formed with shoulders limiting their swinging movement, a longitudinally moving rod in said casing and pivotally connected with said members, and means on the free end of said rod for its connection with the article to be fastened, substantially as set forth.

Signed at New York this 12 day of November, 1907.

LUIGI ROSSI.

Witnesses:
 OSCAR STEYN,
 MAX D. ORDMANN.